(12) United States Patent
Smyers (10) Patent No.: US 6,721,859 B1
(45) Date of Patent: Apr. 13, 2004

(54) MULTI-PROTOCOL MEDIA STORAGE DEVICE IMPLEMENTING PROTOCOLS OPTIMIZED FOR STORING AND RETRIEVING BOTH ASYNCHRONOUS AND ISOCHRONOUS DATA

(75) Inventor: Scott D. Smyers, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/422,870

(22) Filed: Oct. 21, 1999

(51) Int. Cl.⁷ .............................................. G06F 12/00
(52) U.S. Cl. ............................ 711/154; 710/14; 710/33
(58) Field of Search .............................. 710/14, 33, 58, 710/72, 74; 711/112, 113, 114, 154, 147, 153

(56) References Cited

U.S. PATENT DOCUMENTS

| | | | |
|---|---|---|---|
| 3,836,722 A | 9/1974 | Muller et al. | 179/15 BS |
| 3,906,484 A | 9/1975 | Melvin, Jr. et al. | 340/347 DD |
| 4,218,756 A | 8/1980 | Fraser | 364/900 |

(List continued on next page.)

FOREIGN PATENT DOCUMENTS

| | | | |
|---|---|---|---|
| EP | 0 383 437 A2 | 2/1989 | H04J/3/16 |
| EP | 0 535 434 A2 | 4/1993 | H04S/1/00 |
| EP | 0 703 713 A2 | 1/1996 | H04N/7/58 |
| EP | 0 696 853 A2 | 2/1996 | H04B/1/20 |
| EP | 0 860 823 A1 | 8/1998 | G11B/20/10 |
| EP | 0 984 352 A2 | 3/2000 | G06F/3/06 |
| WO | WO 97 33230 | 9/1997 | G06F/13/12 |
| WO | WO 98 47271 | 10/1998 | H04L/29/06 |
| WO | WO 98/47271 | 10/1998 | H04L/29/06 |
| WO | WO 99/41744 | 8/1999 | H04L/29/06 |

OTHER PUBLICATIONS 5.1 Operation Request Blocks (ORB's), T10/1155D Revision 3d, XP–002159193, pp. 22–32.

"The Parallel Protocol Engine" Matthias Kaiserswerth, IEEE/ACM Transactions on Networking, Dec. 1993, New York, pp. 650–663.

"The Programmable Protocol VLSI Engine (PROVE)" A.S. Krishnakumar, W.C. Fischer, and Krishan Sabnani, IEEE Transactions on Communications, Aug. 1994, New York, pp. 2630–2642.

(List continued on next page.)

*Primary Examiner*—Donald Sparks
*Assistant Examiner*—Christian P. Chace
(74) *Attorney, Agent, or Firm*—Haverstock & Owens LLP (57) ABSTRACT

A multi-protocol media storage device operates according to both the AV/C Command Set and the FCP protocol to record and retrieve data in an isochronous format and the SBP-2 protocol to record and retrieve data in an asynchronous format. Isochronous data is recorded on the media storage device on AV tracks according to the AV/C Command Set. Asynchronous data is recorded on the media storage device in sections called asynchronous spaces. Additionally, isochronous data is recorded in a portion of an asynchronous space as described in one or more operation request blocks delivered according to the SBP-2 protocol. The AV tracks and the asynchronous spaces are each preferably numbered with a unique integer value. A management operation request block (ORB) includes a function field that can have a value indicating that the request is a manage asynchronous space request. Within a manage asynchronous space request a sub-function field indicates that the request is a create, delete or query asynchronous space request. Command ORBs having a request format field value of "0" are performed within the lowest numbered asynchronous space. Command ORBs having a request format field value of "1" are performed within an indicated asynchronous space. Previously recorded data within either an AV track or an asynchronous space can be accessed using both the FCP protocol and the SBP-2 protocol.

57 Claims, 5 Drawing Sheets

| 0 | Undefined | | | | |
|---|---|---|---|---|---|
| 4 | Undefined | | | | |
| 8 | Undefined | | | | |
| C | Undefined | | | | |
| 10 | N | Rq | Reserved | fcn | Sub-function |
| 14 | Sub-function dependent | | | | |
| 18 | Status FIFO addr | | | | |
| 1C | | | | | |

U.S. PATENT DOCUMENTS

| | | | |
|---|---|---|---|
| 4,298,932 A | 11/1981 | Sams | 364/200 |
| 4,409,656 A | 10/1983 | Anderson et al. | 364/200 |
| 4,410,983 A | 10/1983 | Cope | 371/8 |
| 4,493,021 A | 1/1985 | Agrawal et al. | 364/200 |
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |
| 5,007,013 A | 4/1991 | Elms | 364/900 |
| 5,008,819 A | 4/1991 | Gorbatenko | 364/200 |
| 5,008,879 A | 4/1991 | Fischer et al. | 370/85.2 |
| 5,052,029 A | 9/1991 | James et al. | 375/107 |
| 5,191,418 A | 3/1993 | Tran | 358/142 |
| 5,208,807 A | 5/1993 | Gass et al. | 370/60.1 |
| 5,287,478 A | 2/1994 | Johnston et al. | 395/425 |
| 5,331,320 A | 7/1994 | Cideciyan et al. | 341/56 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,985 A | 5/1995 | Cantrell et al. | 395/325 |
| 5,432,650 A | 7/1995 | Nunomura et al. | 360/27 |
| 5,465,402 A | 11/1995 | Ono et al. | 455/161.2 |
| 5,473,362 A | 12/1995 | Fitzgerald et al. | 348/7 |
| 5,493,570 A | 2/1996 | Hillman et al. | 370/105.3 |
| 5,499,344 A | 3/1996 | Elnashar et al. | 395/250 |
| 5,506,846 A | 4/1996 | Edem et al. | 370/94.2 |
| 5,509,126 A | 4/1996 | Oprescu et al. | 395/307 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | Delager et al. | 370/60.1 |
| 5,535,208 A | 7/1996 | Kawakami et al. | 370/84 |
| 5,537,408 A | 7/1996 | Branstad et al. | 370/79 |
| 5,544,324 A | 8/1996 | Edem et al. | 395/200.17 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,561,427 A | 10/1996 | Coleman, Jr. | 341/161 |
| 5,566,174 A | 10/1996 | Sato et al. | 370/84 |
| 5,579,278 A | 11/1996 | McLaury | 365/230.05 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,640,286 A | 6/1997 | Acosta et al. | 360/48 |
| 5,640,392 A | 6/1997 | Hayashi | 370/395 |
| 5,640,592 A | 6/1997 | Rao | 370/5 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,661,848 A | 8/1997 | Bonke et al. | 395/439 |
| 5,664,124 A | 9/1997 | Katz et al. | 395/309 |
| 5,668,948 A | 9/1997 | Belknap et al. | 395/200.61 |
| 5,671,441 A | 9/1997 | Glassen et al. | 395/828 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,678 A | 11/1997 | Stallmo et al. | 395/441 |
| 5,689,727 A | 11/1997 | Bonke et al. | 395/840 |
| 5,691,994 A | 11/1997 | Acosta et al. | 371/40.1 |
| 5,692,211 A | 11/1997 | Gulick et al. | 395/800 |
| 5,696,924 A | 12/1997 | Robertson et al. | 395/412 |
| 5,699,503 A | 12/1997 | Bolosky et al. | 395/182.04 |
| 5,704,052 A | 12/1997 | Wu et al. | 395/380 |
| 5,706,439 A | 1/1998 | Paker | 395/200.17 |
| 5,708,779 A | 1/1998 | Graziano et al. | 395/200.8 |
| 5,710,773 A | 1/1998 | Shiga | 370/512 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,764,972 A | 6/1998 | Crouse et al. | 395/601 |
| 5,774,683 A | 6/1998 | Gulick | 395/309 |
| 5,781,599 A | 7/1998 | Shiga | 375/376 |
| 5,781,615 A | 7/1998 | Bales et al. | 379/899 |
| 5,787,256 A | 7/1998 | Marik et al. | 395/200.68 |
| 5,790,886 A | 8/1998 | Allen | 395/825 |
| 5,793,953 A | 8/1998 | Yeung et al. | 395/200.8 |
| 5,809,249 A | 9/1998 | Julyan | 395/200.53 |
| 5,812,883 A | 9/1998 | Rao | 395/8.94 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,835,694 A | 11/1998 | Hodges | 385/182.04 |
| 5,835,726 A | 11/1998 | Shwed et al. | 709/229 |
| 5,835,793 A | 11/1998 | Li et al. | 395/898 |
| 5,848,253 A | 12/1998 | Walsh et al. | 395/309 |
| 5,884,103 A | 3/1999 | Terho et al. | 710/22 |
| 5,887,145 A | 3/1999 | Harari et al. | 395/282 |
| 5,893,148 A | 4/1999 | Genduso et al. | 711/132 |
| 5,928,331 A | 7/1999 | Bushmitch | 709/231 |
| 5,938,752 A | 8/1999 | Leung et al. | 710/126 |
| 5,946,298 A | 8/1999 | Okuyama | 370/232 |
| 5,960,036 A | 9/1999 | Johnson et al. | 375/219 |
| 5,970,236 A | 10/1999 | Galloway et al. | 395/500.44 |
| 5,987,126 A | 11/1999 | Okuyama et al. | 380/5 |
| 5,991,520 A | 11/1999 | Smyers et al. | 395/280 |
| 6,064,676 A | 5/2000 | Slattery et al. | 370/412 |
| 6,085,270 A | 7/2000 | Gulick | 710/100 |
| 6,145,039 A * | 11/2000 | Ajanovic et al. | 710/105 |
| 6,243,778 B1 * | 6/2001 | Fung et al. | 370/462 |
| 6,247,069 B1 | 6/2001 | Smyers | 710/8 |
| 6,282,597 B1 * | 8/2001 | Kawamura | 709/328 |
| 6,334,161 B1 * | 12/2001 | Suzuki et al. | 709/212 |
| 6,374,314 B1 * | 4/2002 | Darnell et al. | 710/29 |
| 6,374,317 B1 * | 4/2002 | Ajanovic et al. | 710/105 |

OTHER PUBLICATIONS

"A Bus on a Diet—The Serial Bus Alternative" Michael Teener, CompCon92, Feb. 24–28, 1992, pp. 316–321.

"Local Area Network Protocol for Autonomous Control of Attached Devices" Software Patent Institute, 1995, 1996.

"Architecture for High Performance Transparent Bridges" Software Patent Institute, 1995, 1996.

"Access to High–Speed LAN via Wireless Media" Software Patent Institute, 1995, 1996.

"Asynchronous Transfer Mode" Julia L. Heeter, Dec. 12, 1995.

"The SerialSoft IEEE 1394 Developer Tool" Skipstone.

"Data link driver program design for the IBM token ring network PC adapter" Gee–Swee Poo and Wilson Ang, Computer Communications, 1989, London, Great Britain, pp. 266–272.

"Fiber Channel (FSC)/ATM interworking: A design solution" A. Anzaloni, M. De Sanctis, F. Avaltroni, G. Rulli, L. Proietti and G. Lombardi, Ericsson Fatme R&D Division, Nov. 1993, pp. 1127–1133.

"Data Exchange Adapter for Micro Channel/370" Software Patent Institute, 1995, 1996.

American National Standards Institute X3T10 Technical Committee, *Information Technology—Serial Bus Protocol 2 (SBP–2)*, Project 1155D, Revision 1e, Nov. 9, 1996.

IEEE, "1394 Standard for a High Performance Serial Bus," 1995, USA.

"IEEE 1394, The Cable Connection to Complete the Digital Revolution," Daniel Moore.

"1394 200Mb/s PHYsical Layer Transceiver," IBM Microelectronics, Product Data Sheet and Application Notes, Version 1.4, Mar. 14, 1996.

"IEEE 1394–1995 Triple Cable Transceiver/Arbiter," Texas Instruments TSB21LV03, Product Preview, Revision0.99, Mar. 19, 1996.

"The IEEE–1394 High Speed Serial Bus." R.H.J. Bloks, Phillips Journal of Research, vol. 50, pp. 209–216, Jul. 1996.

Hoffman, et al., "IEEE 1394: A Ubiquitous Bus," Digest of Papers of the Computer Socity, Computer Conference (COMPCON) Technologies for the Information Superhighway, Mar. 5, 1999 pp 334–338.

"The Raid Book, A Storage System Technology Handbook," Paul Massiglia, Sixth Edition, 1997.

"AV/C Disc Subunit Enhancements for Hard Disk Drive Specification", 1394 Trade Association, Draft 0.8:39, Jul. 8, 1999.

"Digital Interface for Consumer Audio/Video Equipment" Part 1—General, IEC, Feb. 1, 1997, Netherlands.

"P1394a Draft Standard for High Performance Serial Bus (Supplement)" P1394a Draft 2.0, Mar. 15, 1998, p. 1–166.

\* cited by examiner

| 0 | Undefined | | | |
|---|---|---|---|---|
| 4 | Undefined | | | |
| 8 | Undefined | | | |
| C | Undefined | | | |
| 10 | N | Rq | Reserved | fcn | Sub-function |
| 14 | Sub-function dependent | | | |
| 18 | Status FIFO addr | | | |
| 1C | | | | |

*Fig. 6*

MULTI-PROTOCOL MEDIA STORAGE DEVICE IMPLEMENTING PROTOCOLS OPTIMIZED FOR STORING AND RETRIEVING BOTH ASYNCHRONOUS AND ISOCHRONOUS DATA

FIELD OF THE INVENTION

The present invention relates to the field of writing data to and reading data from media storage devices. More particularly, the present invention relates to the field of writing both asynchronous and isochronous data to media storage devices and reading both asynchronous and isochronous data from media storage devices.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard defines a high-speed serial bus for interconnecting digital devices thereby providing a universal I/O connection. The IEEE 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

Figure 1:
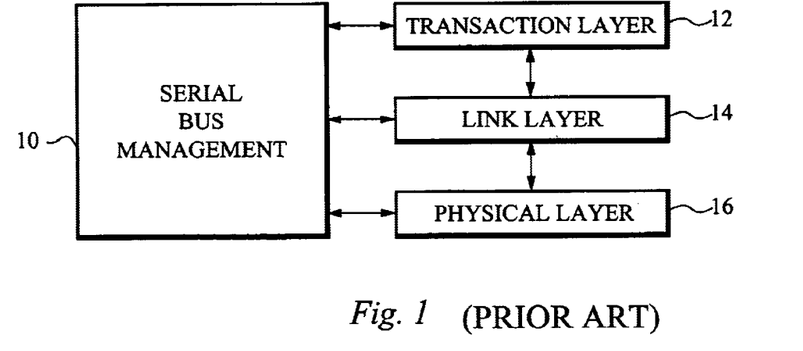
FIG. 1 illustrates a protocol defined by the IEEE 1394-1995 standard.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the protocols necessary to complete asynchronous data transfers, including read, write and lock. The serial bus management block 10 contains an isochronous resource manager for managing the resources associated with isochronous data transfers. The serial bus management block 10 also provides overall configuration control of the serial bus in the form of optimizing arbitration timing, guarantee of adequate electrical power for all devices on the bus, assignment of the cycle master, and allocation of isochronous channel and bandwidth resources.

The AV/C Command Set is a command set used for transactions to and from consumer audio/video equipment over an IEEE 1394-1995 serial bus. This AV/C command set makes use of the Function Control Protocol (FCP) defined by IEC-61883, the ratified international standard for the transport of audio/video command requests and responses. AV/C commands are transmitted through AV/C transactions. An AV/C transaction consists of one AV/C command frame addressed to the target node's FCP_Command register and zero or more AV/C response frames addressed to the requesting node's FCP_Response register.

Each audio/video unit or subunit can implement a subset of the AV/C command set. An unsupported command received by an audio/video unit is rejected with a not implemented response. Support for the different commands is characterized as mandatory, recommended, optional and vendor-dependent. A mandatory command is supported by any audio/video device that claims compliance with the AV/C command set and that implements the audio/video unit or subunit type for which the command is defined. An AV/C compliant device is identified by an entry within its configuration read-only memory (ROM). A recommended command is optional for an AV/C compliant device, but represents a basic functionality, such as video and audio insert modes for a VCR subunit's record command. If the device supports a unit or subunit type that has the functionality corresponding to the command, it is recommended that the command be implemented. An optional command is optional for an AV/C compliant device. Support for and interpretation of a vendor-dependent command are defined by the device vendor.

AV/C commands are grouped into four command types including control, status, inquiry and notify command types. A control command is sent by a controller to another audio/video device, the target, to instruct the target to perform an operation. A target that receives a control command will return an AV/C response frame including either a not implemented, accepted, rejected or interim response code. The target will return a not implemented response code when the target does not support the control command specified or the command is addressed to a subunit not implemented by the target. The target will return an accepted response code when the target implements the control command specified and the current state of the target permits execution of the command. The target will return a rejected response code when the target implements the control command specified but the current state of the target does not permit execution of the command. The target will return an interim response code if the control command specified is implemented by the target, but the target is unable to respond with either an accepted or rejected response code immediately. Unless a subsequent bus reset causes the AV/C transaction to be aborted, the target will ultimately return a response frame with an accepted or rejected response code after returning an interim response code.

A status command is sent by a controller to an audio/video device to request the current status of the target device. Status commands may be sent to either audio/video units or subunits. A target that receives a status command will return an AV/C response frame including either a not implemented, rejected, in transition or stable response code. A target will return a not implemented status response code when the target does not support the status command specified or the command is addressed to a subunit not implemented by the target. A target will return a rejected status response code when the target implements the status command specified but the target state does not permit the return of status for the command. The target will return an in transition status response code when the target implements the status command specified, but the current state of the target is in transition. The target will return a stable status response code when the target implements the status command specified and the information requested is reported in the values in the AV/C response frame.

An inquiry command is used by a controller to determine whether or not a target audio/video device supports a particular control command. A controller can reliably use inquiry commands to probe the capabilities of a target, since the target shall not modify any state nor initiate any command execution in response to an inquiry command. A target that receives an inquiry command will return an AV/C response frame including either an implemented or a not implemented response code. An implemented response code notifies the controlling node that the corresponding control command specified is implemented by the target audio/video device. A not implemented response code notifies the controlling node that the corresponding control command specified is not implemented by the target audio/video device.

A notify command is used by a controller to receive notification of future changes in an audio/video device's state. Responses to a notify command will indicate the current state of the target and then, at some indeterminate time in the future, indicate the changed state of the target. A target that receives a notify command will return an immediate response frame including either a not implemented, rejected or interim response code. A target will return a not implemented response code when the target does not support the notify command specified or the command is addressed to a subunit not implemented by the target. A target will return a rejected response code when the target implements event notification for the condition specified but is not able to supply the requested information. A target will return an interim response code when the target supports the requested event notification and has accepted the notify command for any future change of state. The current state is indicated by the data returned in the response frame. At a future time, the target will then return an AV/C response frame with either a rejected or changed response code.

The AV/C Disk Subunit Enhancements For Hard Disk Drive Specification is a technical specification of the 1394 Trade Association which includes enhancements to the AV/C Command Set for managing the storage and retrieval of audio and video (AV) content to and from hard disk drive devices. Under this AV/C Disk Subunit specification, AV content is stored on a hard disk drive in an AV track. An AV track is defined as a sequence of recorded data and is described by an AV/C object entry. Each AV track is made up of a number of AV frames. An AV frame is a uniquely identifiable section of an AV track. An AV track can be separated into multiple sections called AV segments. AV segments are uniquely identifiable sections of an AV track and can be specified as parameters in AV commands. An AV packet is an accessing unit for an AV track.

Figure 2:
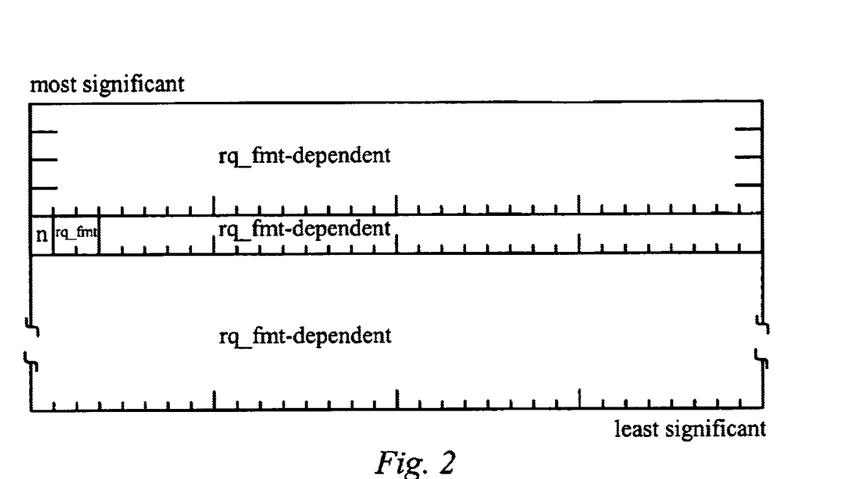
FIG. 2 illustrates a format of an operation request block according to the SBP-2 protocol.

A traditional hard disk drive records data received, over the IEEE 1394-1995 serial bus and plays it back over the IEEE 1394-1995 serial bus according to commands received from an external controller using a protocol such as the serial bus protocol 2 (SBP-2). The external controller is referred to as an initiator and provides command data structures to the hard disk drive referred to as a target which inform the hard disk drive where on the media the data is to be written, in the case of a write operation, or read from, in the case of a read operation. All initiator requests for actions by the target device are expressed within operation request blocks (ORBs) fetched by the target device using read transactions. Each ORB within the SBP-2 protocol has a format as illustrated in FIG. 2. The notify bit n advises the target device whether or not notification of completion of the operation is required. When the notify bit n has a value equal to "0", the target device may elect to suppress completion notification except when there is an error. When the notify bit n has a value equal to "1", the target device always stores a status block in the memory of the initiator device to notify the initiator of completion of the operation. The request format field rq_fmt specifies the format of the ORB. The following formats for the request format field rq_fmt are defined as illustrated below in Table I.

TABLE I

| Value | ORB Format |
|-------|------------|
| 0 | Format specified by SBP-2 |
| 1 | Reserved |
| 2 | Vendor-dependent |
| 3 | Dummy (NOP) request format |

A request format field rq_fmt value of "0" indicates that the ORB has a format specified by the SBP-2 protocol. A request format field rq_fmt value of "2" indicates that the ORB has a format that is vendor dependent. A request format field rq_fmt value of "3" indicates that the ORB has a dummy request format. The request format field rq_fmt value of "1" is reserved for future standardization.

Figure 3:
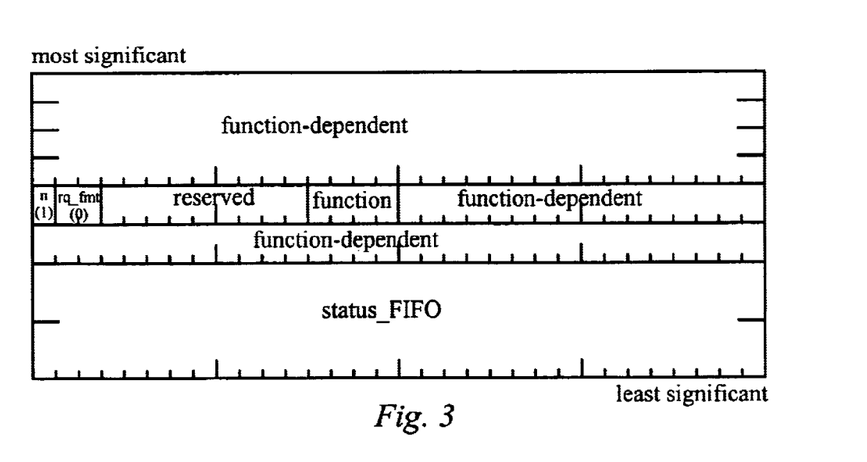
FIG. 3 illustrates a format of a management operation request block according to the SBP-2 protocol.

A management ORB is a 32-byte data structure having a format as illustrated in FIG. 3. For a management ORB, the notify bit n has a value of "1" and the request format field rq_fmt has a value of "0". The function field within the management ORB specifies the management function requested, as defined by the functions listed below in Table II.

TABLE II

| Value | Management Function |
|-------|---------------------|
| 0 | LOGIN |
| 1 | QUERY LOGINS |

TABLE II-continued

| Value | Management Function |
|---|---|
| 2 | Reserved for future standardization |
| 3 | RECONNECT |
| 4 | SET PASSWORD |
| 5–6 | Reserved for future standardization |
| 7 | LOGOUT |
| 8-$A_{16}$ | Reserved for future standardization |
| $B_{16}$ | ABORT TASK |
| $C_{16}$ | ABORT TASK SET |
| $D_{16}$ | Reserved for future standardization |
| $E_{16}$ | LOGICAL UNIT RESET |
| $F_{16}$ | TARGET RESET |

A function field value of "0" indicates that the ORB is requesting a login function. A function field value of "1" indicates that the ORB is requesting a query login function. A function field value of "3" indicates that the ORB is requesting a reconnect function. A function field value of "4" indicates that the ORB is requesting a set password function. A function field value of "7" indicates that the ORB is requesting a logout function. A function field hexadecimal value of "B" indicates that the ORB is requesting an abort task function. A function field hexadecimal value of "C" indicates that the ORB is requesting an abort task set function. A function field hexadecimal value of "E" indicates that the ORB is requesting a logical unit reset function. A function field hexadecimal value of "F" indicates that the ORB is requesting a target reset function. The function field values of "2", "5–6", "8-A" and "D" are reserved for future standardization.

Within the management ORB, the status field status FIFO contains an address allocated for the return of status information generated by the management request. The remainder of the fields within the management ORB of FIG. 3 are function dependent.

Use of a media storage device, such as a hard disk drive, for storing streams of audio and video data is taught in U.S. patent application Ser. No. 09/022,926, filed on Feb. 12, 1998 and entitled "MEDIA STORAGE DEVICE WITH EMBEDDED DATA FILTER FOR DYNAMICALLY PROCESSING DATA DURING READ AND WRITE OPERATIONS," which is hereby incorporated by reference. When storing audio and video data streams on such a hard disk drive, the available capacity of the device can be quickly utilized, due to the large amounts of data included in typical audio and video data streams. If multiple traditional hard disk drives are utilized to store large streams of data, then the user must typically be responsible for management of these storage and retrieval procedures. This storage management responsibility adds complexity to operations such as record and playback and requires the user to monitor and control storage and retrieval operations. An automatically configuring storage array which includes a plurality of media storage devices coupled together within a network of devices is taught in U.S. patent application Ser. No. 09/310,876, filed on May 12, 1999 and entitled "AUTOMATICALLY CONFIGURING STORAGE ARRAY INCLUDING A PLURALITY OF MEDIA STORAGE DEVICES FOR STORING AND PROVIDING DATA WITHIN A NETWORK OF DEVICES," which is hereby incorporated by reference.

Currently, isochronous data recorded using the AV/C Command Set can only be read using the AV/C Command Set. Correspondingly, asynchronous data recorded using the SBP-2 protocol can only be read using the SBP-2 protocol. There is currently no media storage device which can capture data directly from an IEEE 1394-1995 enabled consumer device using the AV/C Command Set and the isochronous communications mechanism, then permit this captured data to be freely read or written using traditional personal computer protocols, such as the SBP-2 protocol. Furthermore, there is currently no media storage device which can capture data directly from a device using traditional personal computer protocols, such as the SBP-2 protocol, then permit this captured data to be freely read or written using the AV/C Command Set and the isochronous communications mechanism.

SUMMARY OF THE INVENTION

A multi-protocol media storage device operates according to both the AV/C Command Set and the FCP protocol to record and retrieve data in an isochronous format and the SBP-2 protocol to record and retrieve data in an asynchronous format. Isochronous data is recorded on the media storage device on AV tracks according to the AV/C Command Set. Asynchronous data is recorded on the media storage device in sections called asynchronous spaces. Additionally, isochronous data is recorded in a portion of an asynchronous space as described in one or more operation request blocks delivered according to the SBP-2 protocol. The AV tracks and the asynchronous spaces are each preferably numbered with a unique integer value. A management operation request block (ORB) includes a function field that can have a value indicating that the request is a manage asynchronous space request. Within a manage asynchronous space request a sub-function field indicates that the request is a create, delete or query asynchronous space request. Command ORBs having a request format field value of "0" are performed within the lowest numbered asynchronous space. Command ORBs having a request format field value of "1" are performed within an indicated asynchronous space. Previously recorded data within either an AV track or an asynchronous space can be accessed using both the FCP protocol and the SBP-2 protocol. Additionally, an initiator can provide an ORB to the target which describes a portion of an asynchronous space in the form of starting address and lengths of multiple discontinuous regions. In this form the target will either record to or play from these portions of the address space using an isochronous data transfer.

In one aspect of the present invention, a method of accessing a media storage device coupled to one or more devices includes the steps of receiving a command from one of the one or more devices, determining if the command is one of an isochronous format command and an asynchronous format command, accessing the media storage device in an asynchronous format if the command is an asynchronous format command and accessing the media storage device in an isochronous format if the command is an isochronous format command. The media storage device records data in the isochronous format in AV tracks and data in the asynchronous format in one or more asynchronous spaces. The isochronous format command is preferably an AV/C command according to FCP protocol. The asynchronous format command is preferably delivered according to SBP-2 protocol. The asynchronous format command includes an operation request block. The operation request block is associated with a scatter/gather list describing portions of asynchronous space on the media storage device to be read or written by isochronous data. The method further includes the step of creating an asynchronous space within the media storage device in response to receiving a manage asynchronous space request requesting creation of the asynchronous space. The method further includes the step of deleting a previously created asynchronous space within the media storage device in response to receiving a manage asynchronous space request requesting deletion of the previously created asynchronous space. The media storage device is preferably a hard disk drive. Communication between the media storage device and the one or more devices preferably substantially complies with a version of the IEEE 1394 standard.

In another aspect of the present invention, a media storage device for storing and retrieving data received from one or more devices in response to a command includes an interface circuit configured to couple to the one or more devices to communicate with the one or more devices, a control circuit coupled to the interface circuit to determine if the command is one of an isochronous format command and an asynchronous format command and media coupled to the control circuit to record isochronous data received from the one or more devices in an AV track in response to an isochronous record command, to record asynchronous data received from the one or more devices in an asynchronous space in response to an asynchronous write command and to retrieve both previously recorded asynchronous data and isochronous data. Preferably, the isochronous format command is an AV/C command according to FCP protocol. Preferably, the asynchronous format command is delivered according to SBP-2 protocol. An asynchronous space is created on the media in response to a manage asynchronous space request requesting creation of the asynchronous space received from one of the one or more devices. The media storage device is preferably a hard disk drive. The interface circuit is preferably coupled to the one or more devices through a network which substantially complies with a version of the IEEE 1394 standard.

In yet another aspect of the present invention, a management operation request block for requesting a manage asynchronous space operation within a media storage device includes a function field including a first value indicating that the operation request block is a manage asynchronous space operation request block and a sub-function field including a second value indicating a type of manage asynchronous space request requested in the management operation request block. The type of manage asynchronous space request is a selective one of a create asynchronous space request, a delete asynchronous space request and a query asynchronous space request. An asynchronous space is created on the media storage device in response to a manage asynchronous space request of the type create asynchronous space. An existing asynchronous space is deleted on the media storage device in response to a manage asynchronous space request of the type delete asynchronous space. Information about existing asynchronous spaces on the media storage device is obtained in response to a manage asynchronous space request of the type query asynchronous space. The management operation request block further includes a notify bit and a request format field. The management operation request block preferably has a format which substantially complies with SBP-2 protocol. The media storage device is preferably a hard disk drive.

In still yet another aspect of the present invention, a method of accessing a media storage device coupled to one or more devices within a network of devices includes the steps of receiving a command from one of the one or more devices, determining if the command is one of an isochronous AV/C format command according to FCP protocol and an asynchronous format command received according to SBP-2 protocol, accessing the media storage device in an asynchronous format according to the SBP-2 protocol if the command is an asynchronous format command and accessing the media storage device in an isochronous format according to the FCP protocol if the command is an isochronous format command. The method further includes the step of storing isochronous data in response to a record isochronous format command within an AV track in the media storage device. The method further includes the step of creating an asynchronous space within the media storage device in response to receiving a manage asynchronous space request requesting creation of the asynchronous space. The method further includes the step of storing asynchronous data in response to a write asynchronous format command within the asynchronous space. The method further includes the step of deleting an existing asynchronous space within the media storage device in response to receiving a manage asynchronous space request requesting deletion of the existing asynchronous space. The method further includes the steps of determining if the command is one of an isochronous format command received according to a modified SBP-2 protocol and accessing the media storage device in an isochronous format if the command is received according to the modified SBP-2 protocol and requests isochronous handling. The method further includes the step of storing isochronous data in response to a command received according to the modified SBP-2 protocol. The media storage device is preferably a hard disk drive. Communication between the network of devices preferably substantially complies with a version of the IEEE 1394 standard.

In yet another aspect of the present invention a network of devices includes one or more content devices for generating and consuming content data and a media storage device coupled to the one or more content devices for storing and retrieving the content data in response to a command, including an interface circuit coupled to the one or more content devices to transmit communications to and receive communications from the one or more content devices, a control circuit coupled to the interface circuit to determine if the command is one of an isochronous format command and an asynchronous format command and media coupled to the control circuit to record isochronous data received from the one or more content devices in an AV track in response to an isochronous record command, to record asynchronous data received from the one or more content devices in an asynchronous space in response to an asynchronous write command and to retrieve both recorded asynchronous data and isochronous data. The network of device further includes a controller coupled to the interface circuit and to the one or more content devices for generating the command and transmitting the command to the interface circuit. The command can also be received from one of the one or more content devices. The isochronous format command is preferably an AV/C command according to FCP protocol. The asynchronous format command is preferably delivered according to SBP-2 protocol. An asynchronous space is created on the media in response to a manage asynchronous space request requesting creation of the asynchronous space received from one of the one or more content devices. The media storage device is preferably a hard disk drive. The interface circuit is preferably coupled to the one or more content devices through a network which substantially complies with a version of the IEEE 1394 standard.

DETAILED DESCRIPTION OF THE PREFERRED EMBODIMENT

An audio/video hard disk drive (AVHDD) operates according to both the AV/C Command Set and the FCP protocol to record and retrieve data in an isochronous format and the SBP-2 protocol to record and retrieve data in an asynchronous format. On the AVHDD, isochronous data is recorded on AV tracks according to the AV/C Command Set. Each of the AV tracks is numbered with an integer value. Asynchronous data is recorded on the AVHDD in sections called asynchronous spaces. Each asynchronous space is also numbered with an integer value. Preferably, the AV tracks and the asynchronous spaces are each numbered with a unique integer value.

The format of the management operation request block (ORB) within the SBP-2 protocol is preferably modified for implementation of the present invention. The management ORB is used create, delete or determine information about asynchronous spaces on the AVHDD. Within the management ORB of the present invention, the function field can have a value indicating that this request is a manage asynchronous space request. Preferably, this value of the function field indicating a manage asynchronous space request is equal to one of the reserved values of the function field described above. The management ORB of the present invention also includes a sub-function field having a value indicating that the request is a create asynchronous space request, a delete asynchronous space request or a query asynchronous space request. The create asynchronous space request is used to create a new asynchronous space within the available space on the AVHDD. The delete asynchronous space request is used to delete a previously created asynchronous space. The query asynchronous space request is used to request the target device to return the numbers of the currently existing asynchronous spaces.

The format of a command ORB within the SBP-2 protocol is also preferably modified for implementation of the present invention. If the command ORB includes a value in the request format field rq_fmt equal to "0", then the operation is performed within the numerically lowest asynchronous space and is treated as a conventional SBP-2 protocol operation. If the command ORB includes a value in the request field rq_fmt equal to "1", then the operation is performed within the existing asynchronous space corresponding to the number indicated within an asynchronous space number field within the command ORB. A value of "1" within the request format field rq_fmt of a command ORB indicates that the initiator recognizes that the AVHDD is operating according to the principles of the present invention and can have more than one asynchronous space.

Isochronous data accesses of the AVHDD using the AV/C Command Set and the FCP protocol are performed on AV tracks, as described above. However, an isochronous data access using the AV/C Command Set and the FCP protocol can also be performed on data within an asynchronous space. Furthermore, an asynchronous data access of data within an isochronous AV track, can also be performed using the modified SBP-2 protocol. In the preferred embodiment of the present invention, the AVHDD does not permit access of a copy-protected AV track using SBP-2 protocols.

Figure 4:
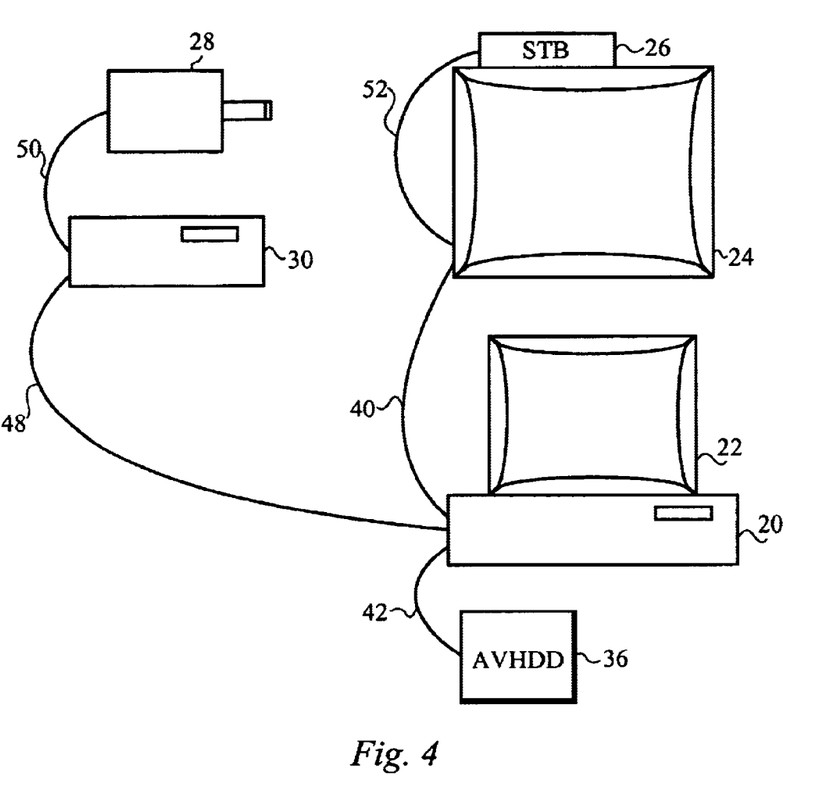
FIG. 4 illustrates an exemplary IEEE 1394-1995 serial bus network of devices including a video camera, a video cassette recorder, a settop box, a television, a computer and an audio/video hard disk drive according to the present invention.

FIG. 4 illustrates an exemplary network of devices including a video camera 28, a video cassette recorder (VCR) 30, a settop box 26, a television 24, a computer 20 and an audio/video hard disk drive (AVHDD) 36 connected together by IEEE 1394-1995 cables 40, 42, 48, 50 and 52. The IEEE 1394-1995 cable 50 couples the video camera 28 to the VCR 30, allowing the video camera 28 to send data, commands and parameters to the VCR 30 for recording. The IEEE 1394-1995 cable 48 couples the VCR 30 to the computer 20. The IEEE 1394-1995 cable 42 couples the computer 20 to the AVHDD 36. The IEEE 1394-1995 cable 40 couples the computer 20 to the television 24. The IEEE 1394-1995 cable 52 couples the television 24 to the settop box 26.

The configuration illustrated in FIG. 4 is exemplary only. It should be apparent that an audio/video network could include many different combinations of components. The devices within such an IEEE 1394-1995 network are autonomous devices, meaning that in an IEEE 1394-1995 network, as the one illustrated in FIG. 4, in which a computer is one of the devices, there is not a true "master-slave" relationship between the computer and the other devices. In many IEEE 1394-1995 network configurations, a computer may not be present. Even in such configurations, the devices within the network are fully capable of interacting with each other on a peer basis. It should be recognized that data, commands and parameters can be sent between all of the devices within the IEEE 1394-1995 network, as appropriate.

Figure 5:
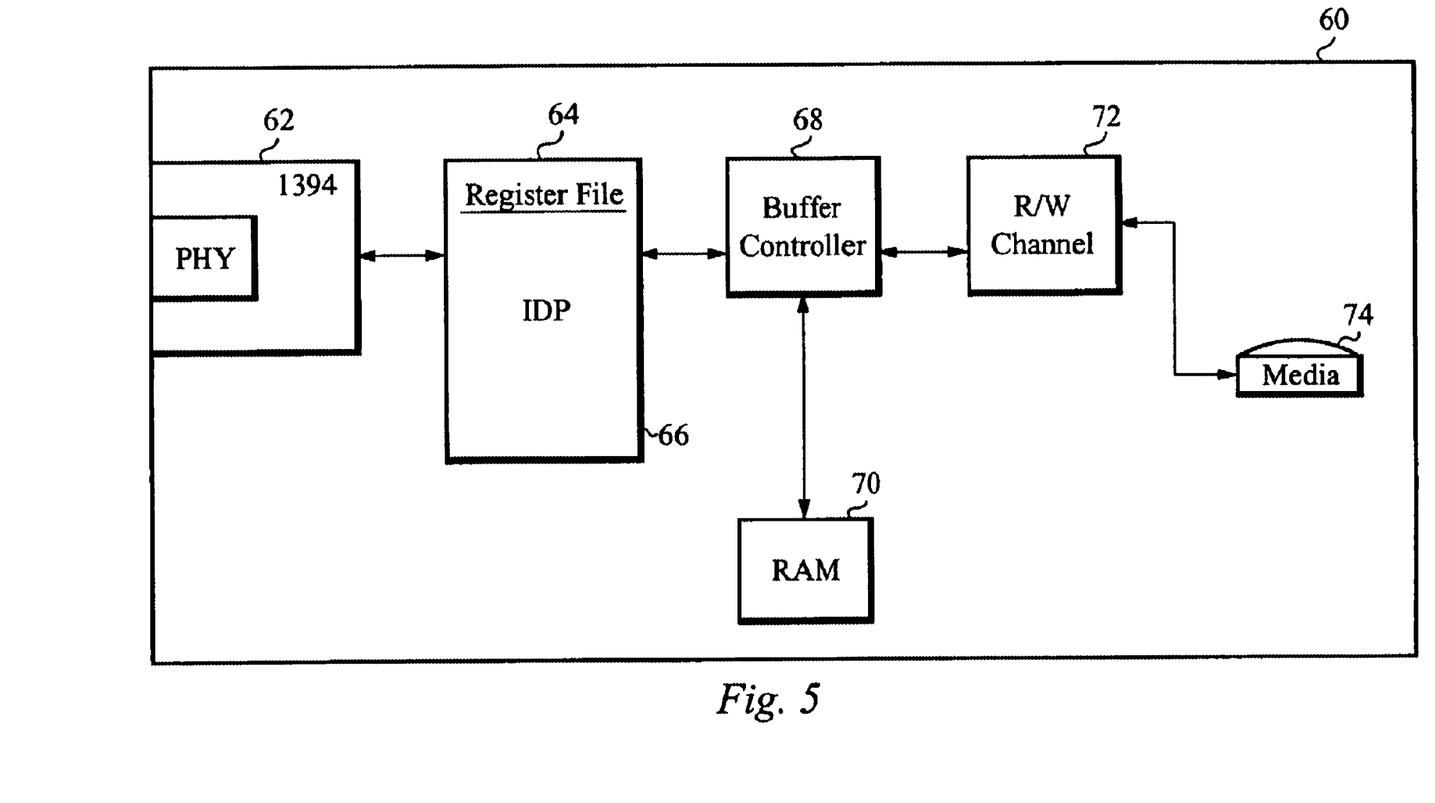
FIG. 5 illustrates a block diagram of a media storage device according to the preferred embodiment of the present invention.

A block diagram of a hardware system resident in the AVHDD of the preferred embodiment of the present invention is illustrated in FIG. 5. The AVHDD 60 preferably includes an IEEE 1394-1995 serial bus interface circuit 62 for sending communications to and receiving communications from other devices coupled to the IEEE 1394-1995 serial bus network. The interface circuit 62 is coupled to an isochronous data pipe 66. The isochronous data pipe 66 includes a register file 64. The isochronous data pipe 66 is coupled to a buffer controller 68. The buffer controller 68 is also coupled to a random access memory circuit 70 and to a read/write channel circuit 72. The read/write channel circuit 72 is coupled to media 74 on which data is stored within the AVHDD 60. The read/write channel circuit 72 controls the storage operations on the media 74, including reading data from the media 74 and writing data to the media 74.

The AVHDD 36 preferably implements both the FCP protocol for recording isochronous data and the SBP-2 protocol for recording asynchronous data. The AVHDD of the present invention also permits data previously recorded in either the isochronous or asynchronous format to be read using either the FCP protocol or the SBP-2 protocol.

The AVHDD of the present invention, if coupled to a controller capable of recognizing an AVHDD subunit and implementing the corresponding AV/C Command Set, will behave in all aspects as an AVHDD subunit. The controller, if using only the AVHDD subunit AV/C Command Set and the FCP protocol, will not know that the AVHDD of the present invention is anything other than a compliant AVHDD subunit.

Figure 6:
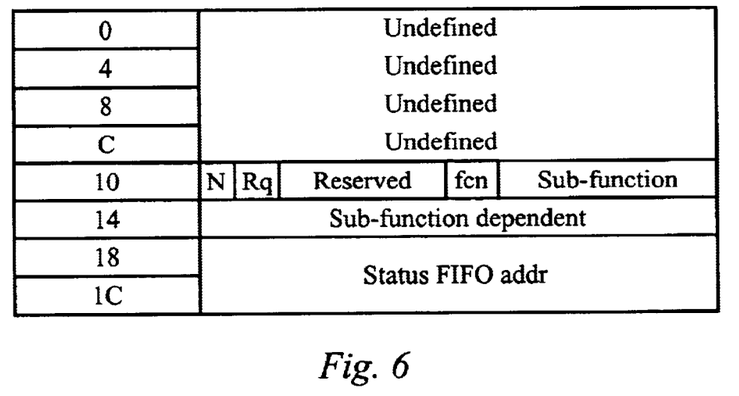
FIG. 6 illustrates a format of a modified management operation request block according to the preferred embodiment of the present invention.

In addition, the AVHDD of the present invention implements the SBP-2 protocol and a suitable industry standard command set for accessing hard disk drives. The AVHDD of the present invention recognizes the conventional ORBs of the SBP-2 protocol as discussed above. The AVHDD of the present invention also recognizes a modified management ORB having a format as illustrated in FIG. 6. The modified management ORB of the present invention includes the notify bit n and the request format field rq_fmt, which are unchanged and defined as discussed above. As described above, the function field specifies the management function requested. Within the modified management ORB of the present invention, the function field contains a value not previously specified by the SBP-2 standard which indicates that this management ORB is requesting a manage asynchrorious space function. Preferably, this value for the function field indicating a manage asynchronous space function is one of the values reserved by the SBP-2 protocol for future standardization.

Within the modified management ORB of the present invention, a sub-function field is included. Preferably, the sub-function field is a 16-bit field. Alternatively, the sub-function field has any appropriate number of bits. The sub-function field exists for the manage asynchronous space ORB and indicates what type of manage asynchronous space operation is requested, as defined by the functions listed below in Table III.

TABLE III

| Value | Operation Requested | Sub-Function Dependent Field |
|---|---|---|
| 0 | Create Asynchronous Space | Size Request (in LBAs) |
| 1 | Delete Asynchronous Space | Asynchronous Space Number |
| 2 | Query Asynchronous Space | Not Used |
| 3–FF | Reserved Values | |

A sub-function field value of "0" indicates a create asynchronous space operation request. A create asynchronous space operation request requests the target device to create an asynchronous space of the size contained in the sub-function dependent field. This size is expressed in units of logical blocks. The response block for this sub-function preferably contains the status of the operation, indicating whether the operation succeeded or failed. If the response block indicates that the operation succeeded, then the response block also contains the integer number of the newly created asynchronous space. If the response block indicates that the operation failed, then the response block also contains the total number of logical block addresses which can be assigned to an asynchronous space. In alternative embodiments, the response block to a create asynchronous space management ORB contains additional appropriate information.

When assigning integer numbers for asynchronous spaces, the target device assigns the numbers from the same space used for AV/C Command Set defined track numbers. During operation, the target device ensures that no asynchronous space has the same number as an AV/C track.

A sub-function field value of "1" indicates a delete asynchronous space operation request. A delete asynchronous space operation request requests the target device to delete the asynchronous space corresponding to the number of the asynchronous space specified in the sub-function dependent field. The response block for this sub-function preferably contains the status of the operation, indicating whether the operation succeeded or failed.

A sub-fuinction field value of "2" indicates a query asynchronous space operation request. A query asynchronous space operation request requests the target device to return the integer numbers of currently existing asynchronous spaces. The data returned for a query asynchronous space request has the format illustrated below in Table IV.

TABLE IV

Number Of Asynchronous Spaces
Asynchronous Space Number
Asynchronous Space Number
Asynchronous Space Number
...

Within the data returned for a query asynchronous space request, the first quadlet contains the number of currently existing asynchronous spaces, followed by that many quadlets. Each succeeding quadlet then contains the number of an existing asynchronous space.

When receiving a command block ORB for an operation request to be performed in an asynchronous space, the AVHDD of the present invention uses the request format field rq_fmt within the command block ORB to determine within which asynchronous space the operation is to be performed. If the request format field rq_fmt within the command block ORB includes a value of "0" then the operation is treated as a conventional asynchronous access request and performed within the numerically lowest asynchronous space. If the request format field rq_fmt within the command block ORB includes a value of "1" then the operation is performed within the existing asynchronous space corresponding to the number indicated within the asynchronous space number field in the command block ORB. Such commands operate on the specified asynchronous space number according to the details of operation of the command contained in the ORB following the asynchronous space number.

On the AVHDD of the present invention, asynchronous spaces are logically contiguous storage areas which are accessed as a flat address space organized as logical blocks. Each asynchronous space begins with a logical block address (LBA) "0" and continues in a contiguous flat address space to the final LBA of the asynchronous space. The value of this final LBA depends on the size of the asynchronous space.

Preferably, the AVHDD 36 of the present invention prevents an AV/C command from modifying any portion of an asynchronous space. However, the AVHDD will attempt to transmit data within an asynchronous space using the AV/C Command Set and the FCP protocol if an AV/C command is received that specifies a track number which is the same as the number of an existing asynchronous space. In this case, the AVHDD treats this asynchronous space as if it were an AV/C track and attempts to play the data within this asynchronous space according to the rules of the AV/C play command. The initiator that stored the content contained in this asynchronous space is responsible for ensuring that the data contained within the asynchronous space is of a format that, if played, results in a meaningful audio/video isochronous stream.

An SBP-2 initiator device can also direct read or write commands to an AV/C track on the AVHDD of the present invention. To do so, the initiator places a valid AV/C track number in the asynchronous space field of a command ORB containing a value of "1" in the request format field rq_fmt.

In this case, the AVHDD uses the LBA in the command in the ORB and addresses the AV/C track as if it were an asynchronous space. While preferably, no asynchronous space is modified by an AV/C command, an AV/C track can be modified by commands delivered according to the SBP-2 protocol. An AV/C track which is modified by SBP-2 protocol delivered commands retains its ability to be played or modified using AV/C commands. Preferably, the AVHDD of the present invention does not allow a copy-protected AV/C track to be accessed using SBP-2 protocol commands.

An SBP-2 initiator device can also direct the AVHDD of the present invention to play, isochronously, a portion of an asynchronous space using a modified ORB. This modified ORB contains a pointer to a logical block address (LBA) scatter/gather list, which is preferably located in the initiator's address space and read by the AVHDD. This scatter/gather list describes that portion of the asynchronous space to be read or written by isochronous data.

In operation, an initiator device, such as the personal computer 20, can configure the AVHDD 36 for asynchronous access operations using the modified management ORB of the present invention. Using the manage asynchronous space management ORB as described above, an initiator can create, delete and obtain information about asynchronous spaces on the AVHDD 36. To create an asynchronous space on the AVHDD 36, the initiator sends a manage asynchronous space management ORB to the AVHDD 36 with a value of "0" in the sub-fumction field, requesting the AVHDD 36 to create an asynchronous space of the size indicated in the sub-function dependent field. When the AVHDD 36 receives such a create asynchronous space request, the AVHDD 36 determines if there is an unused continuous space on the AVHDD 36 of the size requested. If so, then the AVHDD 36 creates the asynchronous space and assigns it a unique number. If there is not an unused continuous space of the size requested, then the AVHDD 36 sends a response block to the initiator indicating that the asynchronous space could not be created.

To delete a previously created asynchronous space, the initiator sends a manage asynchronous space management ORB to the AVHDD 36 with a value of "1" in the sub-function field requesting the AVHDD 36 to delete the asynchronous space corresponding to the number contained within the sub-function dependent field. When the AVHDD 36 receives such a delete asynchronous space request, the AVHDD 36 deletes the appropriate asynchronous space.

To determine the amount and numbers of existing asynchronous spaces, the initiator sends a manage asynchronous space management ORB to the AVHDD 36 with a value of "2" in the sub-function field requesting the AVH to return the numbers of existing asynchronous spaces. When the AVHDD 36 receives such a query asynchronous space request, the AVHDD 36 determines the existing asynchronous space numbers and returns them to the initiator.

Asynchronous data is stored within an asynchronous space in the AVHDD 36 in response to a command ORB from an initiator, such as the personal computer 20. The asynchronous data can originate form any device within the network of devices coupled to the AVHDD 36. When receiving a command ORB requesting a write operation, the AVHDD 36 determines the value of the request format field rq_fmt in the command ORB. If the request format field rq_fmt includes a value of "0" then the write operation is performed and the data written within the numerically lowest asynchronous space in the AVHDD 36. If the request format field rq_fmt includes a value of "1" then the storage operation is performed and the data written within the asynchronous space corresponding to the number indicated within the asynchronous space number field in the command ORB.

Isochronous data is stored in the AVHDD 36 in response to an AV/C record command from a controlling device. The isochronous data can originate from any device within the network of devices coupled to the AVHDD 36. When receiving an AV/C record command, the AVHDD 36 records the isochronous data from the appropriate isochronous channel in an AV track as discussed above. Preferably, the AVHDD 36 prevents an AV/C command from modifying any portion of an asynchronous space. However, an SBP-2 initiator device can direct write commands to an AV/C track on the AVHDD 36.

Data is transmitted from the AVHDD 36 to other devices on the network of devices coupled to the AVHDD 36 in response to both an AV/C play command and a command ORB. When the AVHDD 36 receives an AV/C play command specifying an isochronous track number that track is transmitted per the AV/C Command Set and the FCP protocol. When the AVHDD 36 receives an AV/C play command specifying a track number which is the same as the number of an existing asynchronous space, the AVHDD 36 treats this asynchronous space as if it were an AV/C track and attempts to play the data within this asynchronous space according to the rules of the AV/C play command.

When the AVHDD 36 receives a command ORB from an SBP-2 initiator device requesting a read operation, the AVHDD 36 first determines the value of the request format field rq_fmt. If the request format field rq_fmt has a value of "0" then the read operation is performed from the lowest numbered asynchronous space. If the request format field rq_fmt has a value of "1" then the read operation is performed from the space corresponding to the number within the asynchronous space field. This number can correspond to either an asynchronous space or AV track.

In the manner described herein, data can be recorded and retrieved in the AVHDD 36 in an isochronous format using the AV/C Command Set and the FCP protocol and in an asynchronous format using the SBP-2 protocol. A modified management ORB within the SBP-2 protocol is used to create, delete and obtain information about asynchronous spaces within the AVHDD 36. Isochronous data accesses can be performed in the AVHDD 36 on both the AV tracks and data within an asynchronous space. Preferably, an AV/C command cannot be used to write data within an asynchronous space. Asynchronous data accesses can be performed in the AVHDD 36 within both asynchronous spaces and AV tracks.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures. Additionally, it will also be apparent that while the preferred embodiment of the present invention is implemented within an AVHDD, any other appropriate media storage device can also be used.

I claim:

1. A method of accessing a media storage device coupled to one or more devices, wherein data is written to and read from the media storage device, the method comprising:
   a. receiving a command from one of the one or more devices;
   b. determining if the command is one of an isochronous format command and an asynchronous format command;
   c. accessing the media storage device to selectively write data to and read data from the media storage device in an asynchronous format if the command is an asynchronous format command; and
   d. accessing the media storage device to selectively write data to and read data from the media storage device in an isochronous format if the command is an isochronous format command.

2. The method as claimed in claim 1 wherein the media storage device records data in the isochronous format in AV tracks and data in the asynchronous format in one or more asynchronous spaces.

3. The method as claimed in claim 2 wherein the isochronous format command is an AV/C command according to FCP protocol.

4. The method as claimed in claim 2 wherein the asynchronous format command is delivered according to SBP-2 protocol.

5. The method as claimed in claim 1 wherein the asynchronous format command is delivered according to SBP-2 protocol.

6. The method as claimed in claim 5 wherein the asynchronous format command includes an operation request block.

7. The method as claimed in claim 6 wherein the operation request block is associated with a scatter/gather list describing portions of asynchronous space on the media storage device to be read or written by isochronous data.

8. The method as claimed in claim 1 further comprising creating an asynchronous space within the media storage device in response to receiving a manage asynchronous space request requesting creation of the asynchronous space.

9. The method as claimed in claim 8 further comprising deleting a previously created asynchronous space within the media storage device in response to receiving a manage asynchronous space request requesting deletion of the previously created asynchronous space.

10. The method as claimed in claim 1 wherein the media storage device is a hard disk drive.

11. The method as claimed in claim 1 wherein communication between the media storage device and the one or more devices substantially complies with a version of the IEEE 1394 standard.

12. A media storage device for storing and retrieving data received from one or more devices in response to a command comprising:
   a. an interface circuit configured to couple to the one or more devices to communicate with the one or more devices;
   b. a control circuit coupled to the interface circuit to determine if the command is one of an isochronous format command and an asynchronous format command; and
   c. media coupled to the control circuit to record isochronous data received from the one or more devices in an AV track in response to an isochronous record command, to record asynchronous data received from the one or more devices in an asynchronous space in response to an asynchrons write command and to selectively retrieve and transmit both previously recorded asynchronous data and isochronous data to a requesting device in response to a read command.

13. The media storage device as claimed in claim 12 wherein the isochronous format command is an AV/C command according to FCP protocol.

14. The media storage device as claimed in claim 12 wherein the asynchronous format command is delivered according to SBP-2 protocol.

15. The media storage device as claimed in claim 12 wherein an asynchronous space is created on the media in response to a manage asynchronous space request requesting creation of the asynchronous space received from one of the one or more devices.

16. The media storage device as claimed in claim 12 wherein the media storage device is a hard disk drive.

17. The media storage device as claimed in claim 12 wherein the interface circuit is coupled to the one or more devices through a network which substantially complies with a version of the IEEE 1394 standard.

18. A method of accessing a media storage device coupled to one or more devices within a network of devices, wherein data is written to and read from the media storage device, the method comprising:
   a. receiving a command from one of the one or more devices;
   b. determining if the command is one of an isochronous AV/C format command according to FCP protocol and an asynchronous format command received according to SBP-2 protocol;
   c. accessing the media storage device to selectively write data to and read data from the media storage device in an asynchronous format according to the SBP-2 protocol if the command is an asynchronous format command; and
   d. accessing the media storage device to selectively write data to and read data from the media storage device in an isochronous format according to the FCP protocol if the command is an isochronous format command.

19. The method as claimed in claim 18 further comprising storing isochronous data in response to a record isochronous format command within an AV track in the media storage device.

20. The method as claimed in claim 18 further comprising creating an asynchronous space within the media storage device in response to receiving a manage asynchronous space request requesting creation of the asynchronous space.

21. The method as claimed in claim 20 further comprising storing asynchronous data in response to a write asynchronous format command within the asynchronous space.

22. The method as claimed in claim 20 further comprising deleting an existing asynchronous space within the media storage device in response to receiving a manage asynchronous space request requesting deletion of the existing asynchronous space.

23. The method as claimed in claim 18 further comprising:
   a. determining if the command is one of an isochronous format command received according to a modified SBP-2 protocol; and
   b. accessing the media storage device in an isochronous format if the command is received according to the modified SBP-2 protocol and requests isochronous handling.

24. The method as claimed in claim 23 further comprising storing isochronous data in response to a command received according to the modified SBP-2 protocol.

25. The method as claimed in claim 18 wherein the media storage device is a hard disk drive.

26. The method as claimed in claim 18 wherein communication between the network of devices substantially complies with a version of the IEEE 1394 standard.

27. A network of devices comprising:
   a. one or more content devices for generating and consuming content data; and
   b. a media storage device coupled to the one or more content devices for storing and retrieving the content data in response to a command, including:
      i. an interface circuit coupled to the one or more content devices to transmit communications to and receive communications from the one or more content devices;
      ii. a control circuit coupled to the interface circuit to determine if the command is one of an isochronous format command and an asynchronous format command; and
      iii. media coupled to the control circuit to record isochronous data received from the one or more content devices in an AV track in response to an isochronous record command, to record asynchronous data received from the one or more content devices in an asynchronous space in response to an asynchronous write command and to selectively retrieve and transmit both recorded asynchronous data and isochronous data to a requesting device in response to a read command.

28. The network of devices as claimed in claim 27 further comprising a controller coupled to the interface circuit and to the one or more content devices for generating the command and transmitting the command to the interface circuit.

29. The network of devices as claimed in claim 27 wherein the command is received from one of the one or more content devices.

30. The network of devices as claimed in claim 27 where in the isochronous format command is an AV/C command according to FCP protocol.

31. The network of devices as claimed in claim 27 wherein the asynchronous format command is delivered according to SBP-2 protocol.

32. The network of devices as claimed in claim 27 wherein an asynchronous space is created on the media in response to a manage asynchronous space request requesting creation of the asynchronous space received from one of the one or more content devices.

33. The network of devices as claimed in claim 27 wherein the media storage device is a hard disk drive.

34. The network of devices as claimed in claim 27 wherein the interface circuit is coupled to the one or more content devices through a network which substantially complies with a version of the IEEE 1394 standard.

35. The method as claimed in claim 1 wherein data written in an asynchronous format to the media storage device is read from the media storage device in a selective one of an asynchronous format and an isochronous format.

36. The method as claimed in claim 1 wherein data written in an isochronous format to the media storage device is read from the media storage device in a selective one of an asynchronous format and an isochronous format.

37. The method as claimed in claim 1 wherein the data that is written to and read from the media storage device is content data.

38. The media storage device as claimed in claim 12 wherein data written in an asynchronous format to the media storage device is read from the media storage device in a selective one of an asynchronous format and an isochronous format.

39. The media storage device as claimed in claim 12 wherein data written in an isochronous format to the media storage device is read from the media storage device in a selective one of an asynchronous format and an isochronous format.

40. The media storage device as claimed in claim 12 wherein the data stored on and retrieved from the media storage device is content data.

41. The method as claimed in claim 18 wherein data written in an asynchronous format to the media storage device is read from the media storage device in a selective one of an asynchronous format and an isochronous format.

42. The method as claimed in claim 18 wherein data written in an isochronous format to the media storage device is read from the media storage device in a selective one of an asynchronous format and an isochronous format.

43. The method as claimed in claim 18 wherein the data that is written to and read from the media storage device is content data.

44. The network of devices as claimed in claim 27 wherein data written in an asynchronous format to the media storage device is read from the media storage device in a selective one of an asynchronous format and an isochronous format.

45. The network of devices as claimed in claim 27 wherein data written in an isochronous format to the media storage device is read from the media storage device in a selective one of an asynchronous format and an isochronous format.

46. The network of devices as claimed in claim 27 wherein the data stored on and retrieved from the media storage device is content data.

47. A method of accessing a media storage device coupled to one or more devices, wherein data is written to and read from the media storage device, the method comprising:
   a. receiving a write command from one of the one or more devices to write data to the media storage device;
   b. determining if the write command is one of an isochronous format command and an asynchronous format command;
   c. accessing the media storage device to write the data to the media storage device in an asynchronous format if the write command is an asynchronous format command;
   d. accessing the media storage device to write the data to the media storage device in an isochronous format if the write command is an isochronous format command;
   e. receiving a read command from a requesting device to read stored data from the media storage and transmit the stored data to the requesting device, wherein the requesting device is one of the one or more devices and further wherein the stored data was previously written to the media storage device by one of the one or more devices;
   f. determining if the read command is one of an isochronous format command and an asynchronous format command;
   g. accessing the media storage device to read the stored data from the media storage device and transmit the stored data to the requesting device in an asynchronous format if the read command is an asynchronous format command; and h. accessing the media storage device to read the stored data from the media storage device and transmit the stored data to the requesting device in an isochronous format if the read command is an isochronous format command.

48. The method as claimed in claim 47 wherein the media storage device records data in the isochronous format in AV tracks and data in the asynchronous format in one or more asynchronous spaces.

49. The method as claimed in claim 48 wherein the isochronous format command is an AV/C command according to FCP protocol.

50. The method as claimed in claim 48 wherein the asynchronous format command is delivered according to SBP-2 protocol.

51. The method as claimed in claim 47 wherein the asynchronous format command is delivered according to SBP-2 protocol.

52. The method as claimed in claim 51 wherein the asynchronous format command includes an operation request block.

53. The method as claimed in claim 52 wherein the operation request block is associated with a scatter/gather list describing portions or asynchronous space on the media storage device to be read or written by isochronous data.

54. The method as claimed in claim 47 further comprising creating an asynchronous space within the media storage device in response to receiving a manage asynchronous space request requesting creation of the asynchronous space.

55. The method as claimed in claim 54 further comprising deleting a previously created asynchronous space within the media storage device in response to receiving a manage asynchronous space request requesting deletion of the previously created asynchronous space.

56. The method as claimed in claim 47 wherein the media storage device is a hard disk drive.

57. The method as claimed in claim 47 wherein communication between the media storage device and the one or more devices substantially complies with a version of the IEEE 1394 standard.

* * * * *